(12) United States Patent
Tsai et al.

(10) Patent No.: US 10,484,857 B2
(45) Date of Patent: Nov. 19, 2019

(54) SERVICE DISCOVERY WITH LOW POWER CONSUMPTION IN WIRELESS COMMUNICATIONS NETWORKS

(71) Applicant: MEDIATEK INC., Hsin-Chu (TW)

(72) Inventors: Yu-Che Tsai, Hsinchu (TW); Chao-Chun Wang, Taipei (TW)

(73) Assignee: MediaTek Inc., Hsin-Chu (TW)

( * ) Notice: Subject to any disclaimer, the term of this patent is extended or adjusted under 35 U.S.C. 154(b) by 101 days.

(21) Appl. No.: 14/915,642

(22) PCT Filed: Aug. 13, 2015

(86) PCT No.: PCT/CN2015/086862
§ 371 (c)(1),
(2) Date: Mar. 1, 2016

(87) PCT Pub. No.: WO2016/023505
PCT Pub. Date: Feb. 18, 2016

(65) Prior Publication Data
US 2016/0205533 A1    Jul. 14, 2016

Related U.S. Application Data

(60) Provisional application No. 62/036,636, filed on Aug. 13, 2014, provisional application No. 62/037,117, filed on Aug. 14, 2014.

(51) Int. Cl.
*H04W 8/00* (2009.01)
*H04W 4/02* (2018.01)
(Continued)

(52) U.S. Cl.
CPC ............. *H04W 8/005* (2013.01); *H04L 67/16* (2013.01); *H04W 4/023* (2013.01);
(Continued)

(58) Field of Classification Search
None
See application file for complete search history.

(56) References Cited

U.S. PATENT DOCUMENTS

2009/0029691 A1   1/2009  Shen et al.
2009/0240794 A1*  9/2009  Liu .................. H04L 29/08846
                                                  709/223
(Continued)

FOREIGN PATENT DOCUMENTS

CA   2 530 715 A1   3/2005
CA   2 892 372 A1   6/2014
(Continued)

OTHER PUBLICATIONS

"International Search Report" dated Nov. 17, 2015 for International application No. PCT/CN2015/086862, International filing date:Aug. 13, 2015.

*Primary Examiner* — Chi H Pham
*Assistant Examiner* — Raul Rivas
(74) *Attorney, Agent, or Firm* — Wolf, Greenfield & Sacks, P.C.

(57) ABSTRACT

An access point (AP) accepts a communications device to join a wireless communications network. The AP registers a service provided by the communications device. The service is available in accordance with a schedule and a set of service parameters. The AP receives a request from a peer communications device seeking the service. The AP announces availability of the service on behalf of the communications device while the communications device is unavailable. The service is later provided by the communications device to the peer communications device when both devices are available to communicate. By utilizing an always-on AP to announce service availability and to exchange service parameters, fast service discovery can be (Continued)

achieved with low power consumption for both service advertisers and service seekers.

21 Claims, 4 Drawing Sheets

(51) Int. Cl.
  *H04W 52/02* (2009.01)
  *H04W 76/10* (2018.01)
  *H04L 29/08* (2006.01)
  *H04W 88/18* (2009.01)
  *H04W 76/14* (2018.01)
  *H04W 84/12* (2009.01)
  *H04W 4/80* (2018.01)

(52) U.S. Cl.
  CPC ....... *H04W 52/0216* (2013.01); *H04W 76/10* (2018.02); *H04W 76/14* (2018.02); *H04W 88/182* (2013.01); *H04W 4/80* (2018.02); *H04W 84/12* (2013.01); *Y02D 70/00* (2018.01); *Y02D 70/142* (2018.01); *Y02D 70/22* (2018.01)

(56) References Cited

U.S. PATENT DOCUMENTS

| | | | |
|---|---|---|---|
| 2009/0245133 A1 | 10/2009 | Gupta et al. | |
| 2010/0322213 A1* | 12/2010 | Liu | ........................ H04L 67/16 370/338 |
| 2011/0239011 A1 | 9/2011 | Waris | |
| 2013/0322297 A1 | 12/2013 | Dominguez | |
| 2014/0143839 A1* | 5/2014 | Ricci | ..................... H04W 12/06 726/4 |

FOREIGN PATENT DOCUMENTS

| | | |
|---|---|---|
| CN | 1823495 A | 8/2006 |
| CN | 101471931 A | 7/2009 |
| CN | 101572938 A | 11/2009 |
| CN | 101605299 A | 12/2009 |
| EP | 2858421 A1 | 4/2015 |
| WO | WO 2014/005330 A1 | 1/2014 |

* cited by examiner

SERVICE DISCOVERY WITH LOW POWER CONSUMPTION IN WIRELESS COMMUNICATIONS NETWORKS

CROSS REFERENCE TO RELATED APPLICATIONS

This application is a national stage filing under 35 U.S.C. § 371 of International Patent Application Serial No. PCT/CN2015/086862, filed Aug. 13, 2015, which claims priority to U.S. Provisional Application Ser. No. 62/037,117, filed Aug. 14, 2014 and U.S. Provisional Application Ser. No. 62/036,636, filed Aug. 13, 2014, the contents of each of which is herein incorporated by reference.

TECHNICAL FIELD

The disclosed embodiments relate generally to wireless network communications, and, more particularly, to low power consumption service discovery in wireless communications systems.

BACKGROUND

IEEE 802.11 is a set of media access control (MAC) and physical layer (PHY) specification for implementing wireless local area network (WLAN) communication in the Wi-Fi (2.4, 3.6, 5, and 60 GHz) frequency bands. The 802.11 family consists of a series of half-duplex over-the-air modulation techniques that use the same basic protocol. The standards and amendments provide the basis for wireless network products using the Wi-Fi frequency bands. For example, IEEE 802.11n is an amendment that improves upon the previous IEEE 802.11 standards by adding multiple-input multiple-output antennas (MIMO). IEEE 802.11ac is an amendment to IEEE 802.11 that builds on 802.11n. Changes compared to 802.11n include wider channels (80 or 160 MHz versus 40 MHz) in the 5 GHz band, more spatial streams (up to eight versus four), higher-order modulation (up to 256-QAM vs. 64-QAM), and the addition of Multi-user MIMO (MU-MIMO). IEEE 802.11ad is an amendment that defines a new physical layer for 802.11 networks to operate in the 60 GHz millimeter wave spectrum. This frequency band has significantly different propagation characteristics than the 2.4 GHz and 5 GHz bands where Wi-Fi networks operate. IEEE 802.11ah defines a WLAN system operating at sub 1 GHz license-exempt bands. 802.11ah can provide improved transmission range compared with the conventional 802.11 WLANs operating in the 2.4 GHz and 5 GHz bands. 802.11ah can be used for various purposes including large-scale sensor networks, extended range hotspot, and outdoor Wi-Fi for cellular traffic offloading, whereas the available bandwidth is relatively narrow. IEEE 802.11ax is the successor to 802.11ac; it will increase the efficiency of WLAN networks. IEEE 802.11ax is currently at a very early stage of development and has the goal of providing 4× the throughput of 802.11ac.

As Wi-Fi technology increases in both technical complexity and a broadening feature set, there is a clear need for the industry to define and adopt a common platform where the interoperability of essential, underlying capabilities can be assured. Moreover, the industry and membership will benefit from the availability of a re-usable, modular platform that existing and future Wi-Fi Alliance programs can easily adopt. Wi-Fi Alliance Application Services Platform 2 (ASP2) program builds upon the ASP functionality originally defined in Wi-Fi Direct Services. The goal of the ASP2 is to define the required capabilities and corresponding test plan for the new functionality provided by ASP2.

The ASP functionality in Wi-Fi Peer-to-Peer (P2P) Services specification has defined a service discovery mechanism and connectivity using P2P. In current mobile communications networks, a service advertiser is not restricted to access point (AP). Any wireless station (STA) client can be a service advertiser. The service advertiser can never sleep as long as it provides service. As a result, when STA is being a service advertiser, the high power consumption becomes a main issue for the STA. A solution for service discovery with very low power consumption is sought.

SUMMARY

An access point (AP) accepts a communications device to join a wireless communications network. The AP registers a service provided by the communications device. The service is available in accordance with a schedule and a set of service parameters. The AP receives a request from a peer communications device seeking the service. The AP announces availability of the service on behalf of the communications device while the communications device is unavailable. The service is later provided by the communications device to the peer communications device when both devices are available to communicate. By utilizing an always-on AP to announce service availability and to exchange service parameters, fast service discovery can be achieved with low power consumption for both service advertisers and service seekers.

In one embodiment, a communications device joins a mobile communications network managed by a management entity. The communications device registers a service to the management entity. The service is available in accordance with a schedule and a set of service parameters. The service is announced by the management entity on behalf of the communications device when the communications device is unavailable. The communications device receives a notice from the management entity for providing the service to a peer communications device. Finally, the communications device provides service to the peer communications device when both devices are available to communicate.

In another embodiment, a communications device transmits a first request for seeking a service to a management entity in a wireless communications network. The communications device receives a response from the management entity on behalf of a peer communications device when the peer communications device is unavailable. The service is provided by the peer communications in accordance with a schedule and a set of parameters. The communications device transmits a second request for establishing a session for the service based on the response. The communications device then receives the service provided by the peer communications device when both devices are available to communicate.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
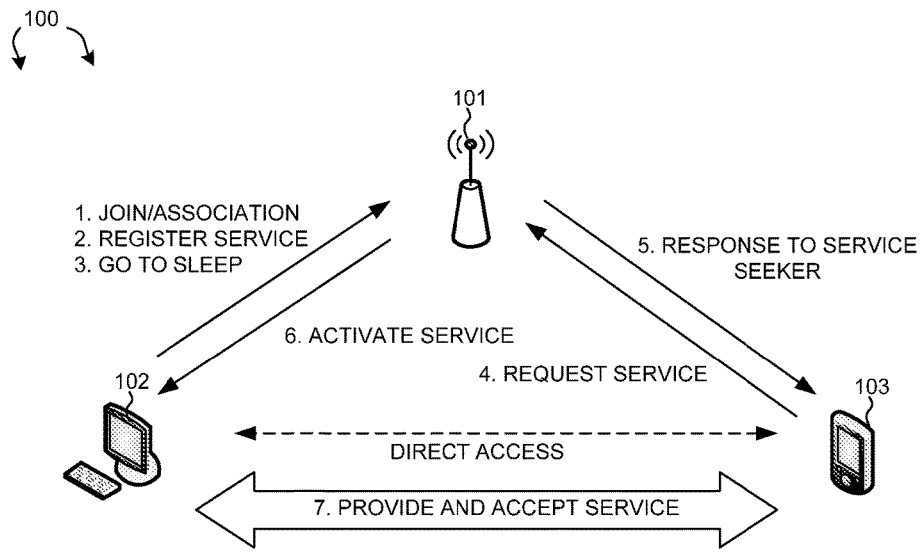
FIG. 1 illustrates a wireless communications system with enhanced service discovery in accordance with one novel aspect.

FIG. 1 illustrates a wireless communications network 100 with enhanced service discovery in accordance with one novel aspect. Wireless communications network 100 comprises an access point AP 101, a non-AP station STA 102, and another non-AP station STA 103. In such a wireless network, any mobile station may provide specific services such as Wi-Fi access, streaming, printing, gaming, while other mobile stations may seek for those specific services. Further, a mobile device may provide services to neighboring devices while receiving services from other neighboring devices.

In the example of FIG. 1, STA 102 is a service advertiser that provides a specific type of service. STA 103 is a service seeker that needs the specific type of service. STA 103 may try to access STA 102 directly for providing the service, as depicted by dashed line 111. STA 102, as a service advertiser, can never go to sleep to save power as long as it provides the service to other mobile devices in the network. This results in very high power consumption for STA 102. If STA 102 and STA 103 are personal mobile devices, then such high power consumption is to be avoided. On the other hand, AP 101 is a management entity for the wireless network, and AP 101 is always on to serve the network.

In accordance with one novel aspect, AP 101 can be used as a proxy agent to announce the service advertisement and service request on behalf of the other service advertisers and service seekers in the network. As illustrated in FIG. 1, in step 1, STA 102 joins the network and establishes a connection with AP 101. In step 2, STA 102 registers its service to AP 101. The registered service is associated with certain schedule (timetable) for service availability, as well as a set of service-related parameters. In step 3, STA 102 goes to sleep to save power. In step 4, STA 103 sends a request to AP 101 seeking the service. In step 5, AP 101 sends a response to STA 103 on behalf of STA 102. AP 101 may further exchange additional information with respect to the service, its availability, and associated parameters. In step 6, AP 101 sends a notice to STA 102 to wake up STA 102 and to activate the service. Finally, in step 7, STA 102 and STA 103 establishes a session connection according to a selected service portal. By using AP 101 as a proxy agent to advertise its service, STA 102 is able to save power consumption during non-service time.

Figure 2:
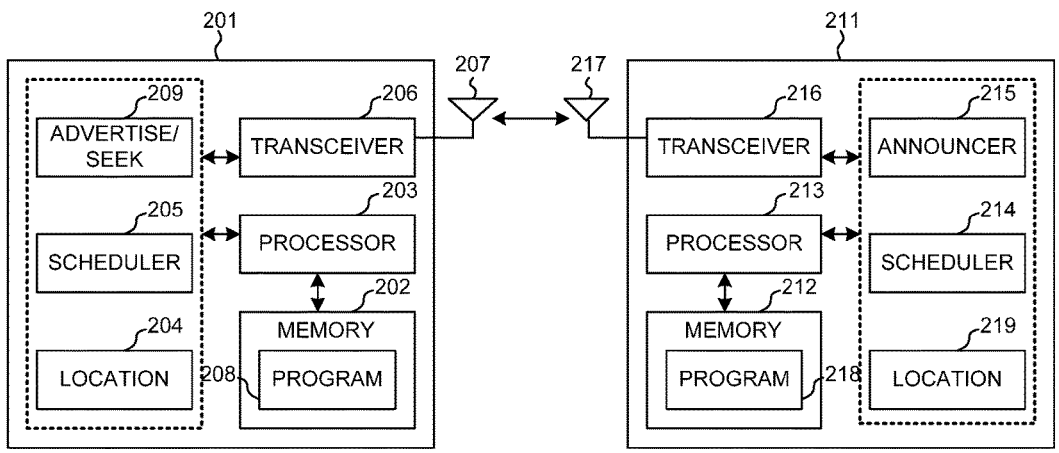
FIG. 2 is a simplified block diagram of a wireless transmitting device and a receiving device in accordance with one novel aspect.

FIG. 2 is a simplified block diagram of a mobile communications device 201 as a service advertiser or seeker and a mobile communications device 211 as a service announcer in accordance with a novel aspect. For wireless device 201, antenna 207 transmits and receives radio signals. RF transceiver module 206, coupled with the antenna, receives RF signals from the antenna, converts them to baseband signals and sends them to processor 203. RF transceiver 206 also converts received baseband signals from the processor, converts them to RF signals, and sends out to antenna 207. Processor 203 processes the received baseband signals and invokes different functional modules to perform features in wireless device 201. Memory 202 stores program instructions and data 208 to control the operations of the wireless device.

Similar configuration exists in wireless device 211 where antenna 217 transmits and receives RF signals. RF transceiver module 216, coupled with the antenna, receives RF signals from the antenna, converts them to baseband signals and sends them to processor 213. The RF transceiver 216 also converts received baseband signals from the processor, converts them to RF signals, and sends out to antenna 217. Processor 213 processes the received baseband signals and invokes different functional modules to perform features in wireless device 211. Memory 212 stores program instructions and data 218 to control the operations of the wireless device.

The wireless devices 201 and 211 also include several configurable functional circuitries and modules that are configured to carry out some embodiments of the present invention. The different functional modules can be implemented by software, firmware, hardware, or any combination thereof. The function modules, when executed by the processors 203 and 213 (e.g., via executing program codes 208 and 218), for example, allow device 201 to advertise or request certain services to its neighboring devices, and allow device 211 to announce service advertisements and needs for its neighboring devices. In one example, device 201 is a service advertiser. Device 201 sends a request to device 211 for advertising a service via advertising module 209. The service is scheduled in accordance with a first schedule via scheduler 205. Device 201 also provides its location information via location module 204. In another example, device 201 is a service seeker. Device 201 sends a request to device 211 for seeking a service via seeking module 209. The service is needed in accordance with a second schedule via scheduler 205. Upon receive the request, device 211 announces the request on behalf of device 201 such that other neighboring devices in the network are aware of the service provided or needed. More importantly, device 201 can go to power-saving mode and delegate the service advertisement/request to device 211, which may be an access point and is always on. As a result, power saving for device 201 can be achieved. Furthermore, AP 211 may forward location information and scheduling information related to the service such that the service is provided and accepted at the right place and the right time.

Figure 3:
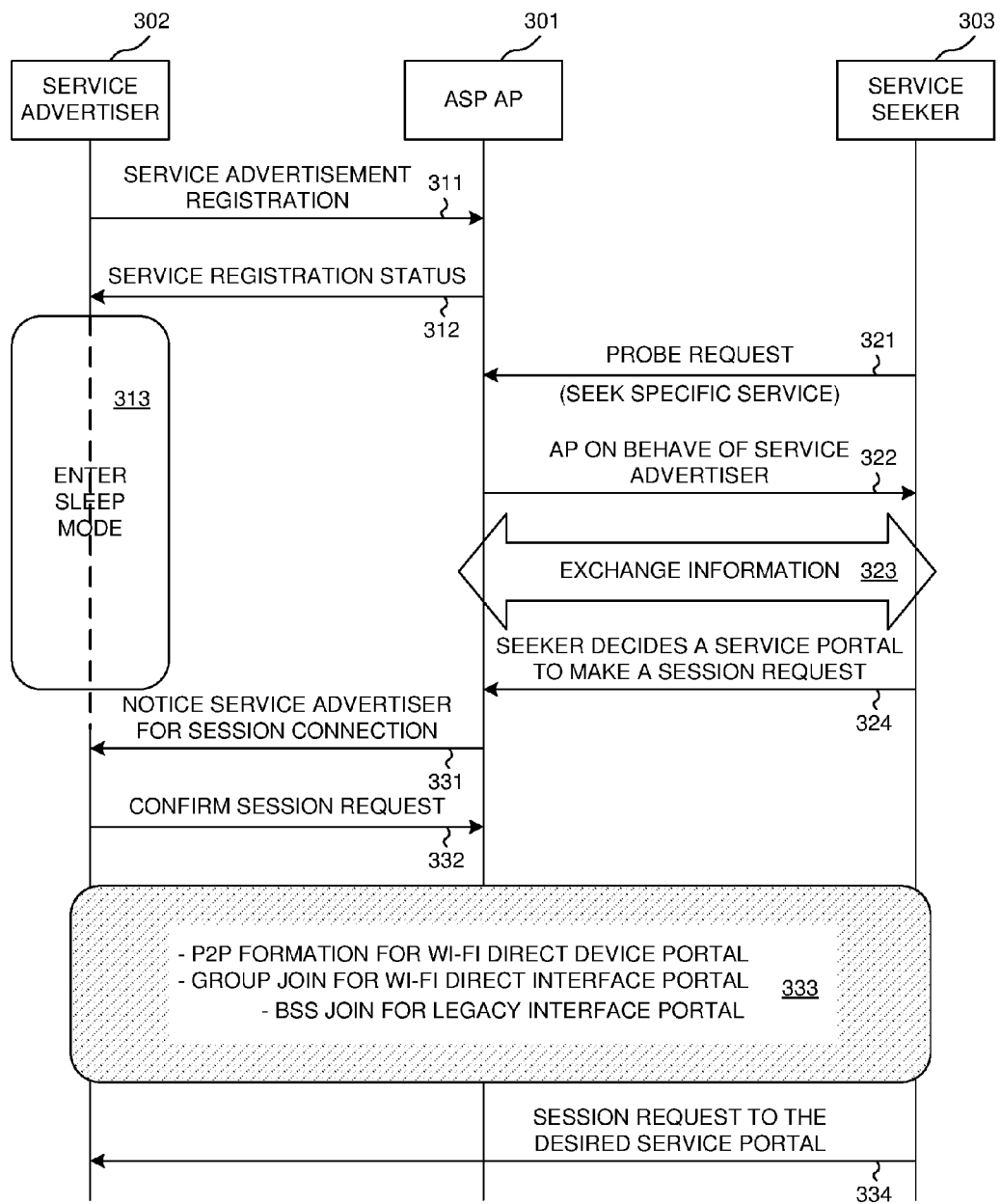
FIG. 3 is a signaling diagram of one embodiment of service discovery between an access point (AP STA) and two stations (non-AP STAs).

FIG. 3 is a signaling diagram of one embodiment of service discovery between an access point (AP STA 301) and two stations (non-AP STA 302 and STA 303). In the example of FIG. 3, STA 302 is a service advertiser that provides one or more specific services and STA 303 is a service seeker seeking one or more specific services. In step 311, STA 302 joins the wireless network managed by AP 301 and registers its service with AP 301. The service registration may involve sending service schedule and other parameters (e.g., speed, cost, quality, etc.) to AP 301. In step 312, AP 302 replies with a service registration status back to STA 302. Upon successful service registration, in step 313, STA 302 enters power saving mode. During power saving, STA 302 may periodically listens to incoming messages, but does not actively provide any service to others.

In step 321, STA 303 sends a message (e.g., a probe request) to AP 301 seeking a specific service. Upon receiving the request, AP 301, on behalf of STA 302, sends a probe response back to STA 303 in step 322. The response may comprise the service availability and parameters of the service provided by STA 302. In an alternative example, AP 301 may sends service advertisement on behalf of STA 302 prior to receiving any request from STA 303. In step 323, AP 301 and STA 303 may further exchange or negotiate additional information related to the service. For example, STA 303 may send AP 301 its own availability and/or its desired schedule for receiving the service. In another example, AP 301 also provides scheduling information, location information, and ranging information with respect to the service provided by STA 302. If STA 302 and STA 303 are hidden from each other due to their physical distance, then by providing the location and ranging information, the service seeker (STA 303) may later move closer to the service advertiser (STA 302) for receiving the service. In yet another example, AP 301 may act as the proxy agent for multiple service advertisers that have registered their services. AP 301 thus may provide service-related information for all the service advertisers to STA 303. In step 324, STA 303 determines a service portal to make a session request based on the exchanged information. The service information allows STA 303 to select the connection method, forming a new group, or join existing one.

In step 331, AP 301 notifies STA 302 for the session request from STA 303. In one example, AP 301 notifies STA 302 as soon as AP 301 receives the session request from STA 303. In another example, AP 301 can wait until STA 303 exits sleep mode and is available for service based on its schedule. In step 332, STA 302 confirms the session request to AP 301 and wakes up according to the service portal type and connection method. According to different service portal type, as depicted by box 333, different operations may be applied including: P2P formation for Wi-Fi Direct Device Portal, Group join for Wi-Fi Direct Interface Portal, or BSS join for legacy interface portal. In step 334, STA 303 sends a session request to the desired service portal.

Figure 4:
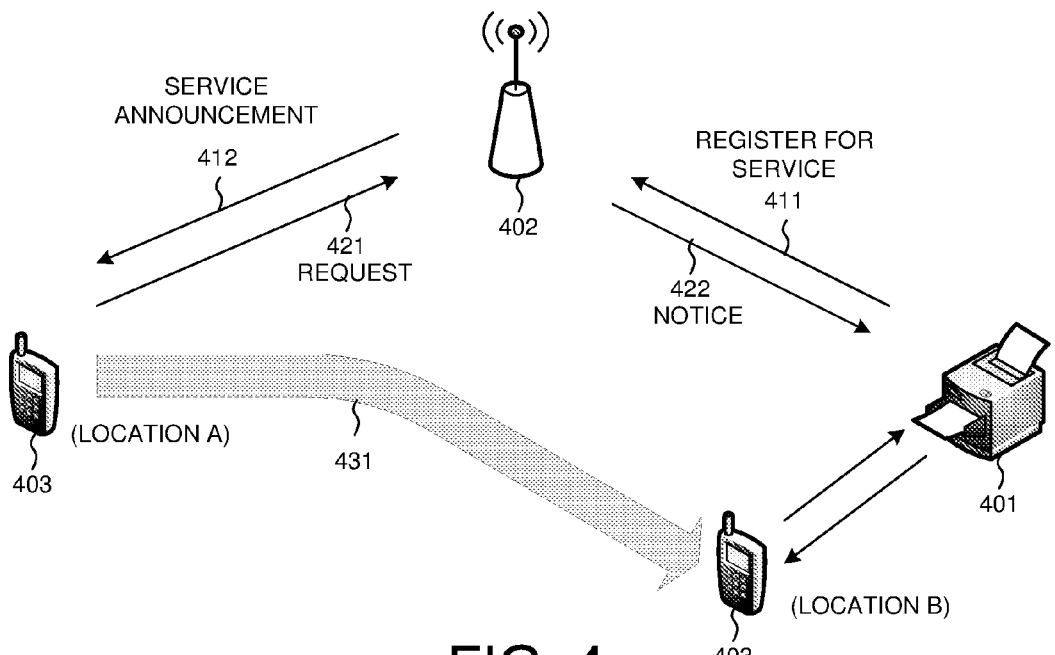
FIG. 4 illustrates one example of enhanced service discovery using an access point.

FIG. 4 illustrates one example of enhanced service discovery using an access point (AP). In the example of FIG. 4, device 401 is a service advertiser, e.g., providing photo printing service. Device 403 is a service subscriber, e.g., seeking photo printing service. Device 402 is an access point. In one advantageous aspect, device 401 and device 403 are devices with very low power consumption, and utilizes AP 402 as a proxy agent for efficient service discovery. For example, device 401 registers the service with AP 402 and enters sleep mode with long sleep window (as depicted by line 411). On the other hand, AP 402 is always on. AP 402 is then used as a proxy agent to announce the service advertisement for device 401 (as depicted by line 412).

In one scenario, AP 402 continues to act as a proxy agent for device 401 and device 403. AP 402 receives service request from device 402 (as depicted by line 421), exchanges service information with device 402 on behalf of device 401, and forwards a session request to device 401 (as depicted by line 422) on behalf of device 403 when device 403 decides the service portal type and connection method. Device 401 then wakes up to respond to the session request and provides service to device 403 accordingly. In another scenario, device 401 can simply wake up based on its schedule for service, and device 403 can also send the session request directly to device 401 based on the schedule information received from AP 402. As a result, devices 401 and 403 can remain very low power consumption while still able to have fast service discovery and session connection setup.

In another advantageous aspect, device 401 and device 403 are located beyond the reach of radio signals from each other and thus are hidden from each other. On the other hand, AP 402 is located in between the two devices and are able to transmit and receive radio signals to/from both of the devices. AP 402 is then used as a proxy agent to announce the service advertisement for device 401 (as depicted by 411 and 412), or announce the service request for device 403 (as depicted by 421 and 422). AP 402 also provides scheduling information, location information, and ranging information with respect to the service provided by device 401. Later on, device 403 can move from its original location (Location A) to a new location (Location B) that is closer to device 401 at a scheduled service time (as depicted by 431). As a result, the maximum service advertising range is twice longer and coverage is four-times larger.

Figure 5:
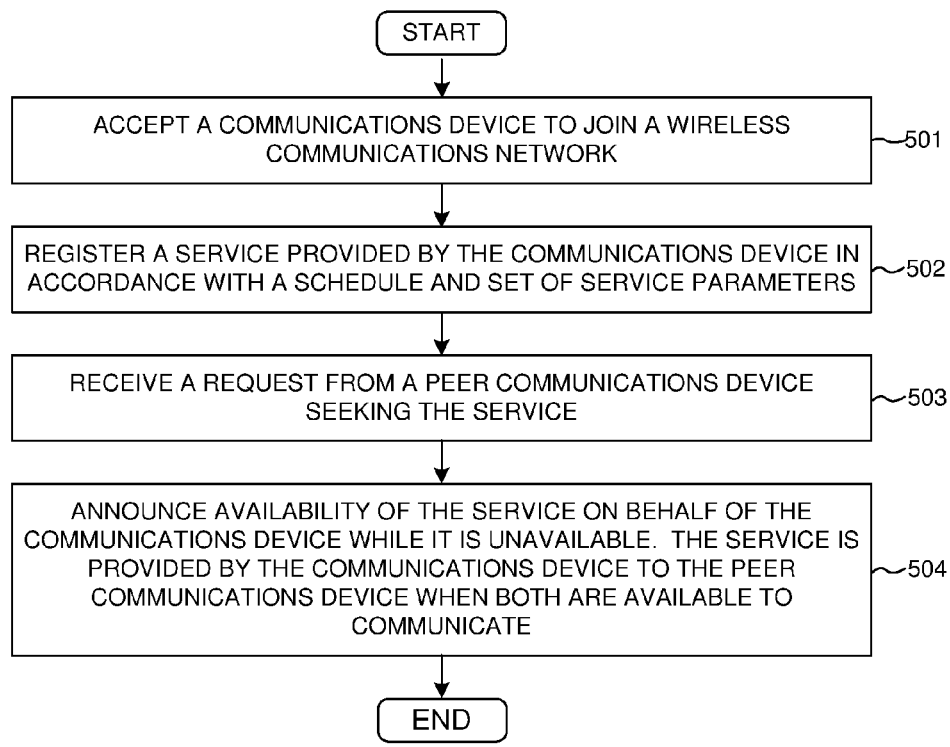
FIG. 5 is flow chart of a method of enhanced service discovery from access point perspective in accordance with a novel aspect.

FIG. 5 is flow chart of a method of enhanced service discovery from access point perspective in accordance with a novel aspect. In step 501, an access point (AP) accepts a communications device to join a wireless communications network. In step 502, the AP registers a service provided by the communications device. The service is available in accordance with a schedule and a set of service parameters. In step 503, the AP receives a request from a peer communications device seeking the service. In step 504, the AP announces availability of the service on behalf of the communications device while the communications device is unavailable. The service is later provided by the communications device to the peer communications device when both devices are available to communicate. In one embodiment, the communications device is unavailable when entering power saving mode in accordance with the schedule. The AP announce the service availability with the scheduling information to the peer communications device. In another embodiment, the communications device is unavailable when a distance from the peer communications device is over a pre-defined range. The AP transmits location information and ranging information of the communications device to the peer communications device. Once the peer communications device determines a desired service portal and connection type, the AP then forwards a notice to the communication device to wake up and establish a session connection with the peer communications device.

Figure 6:
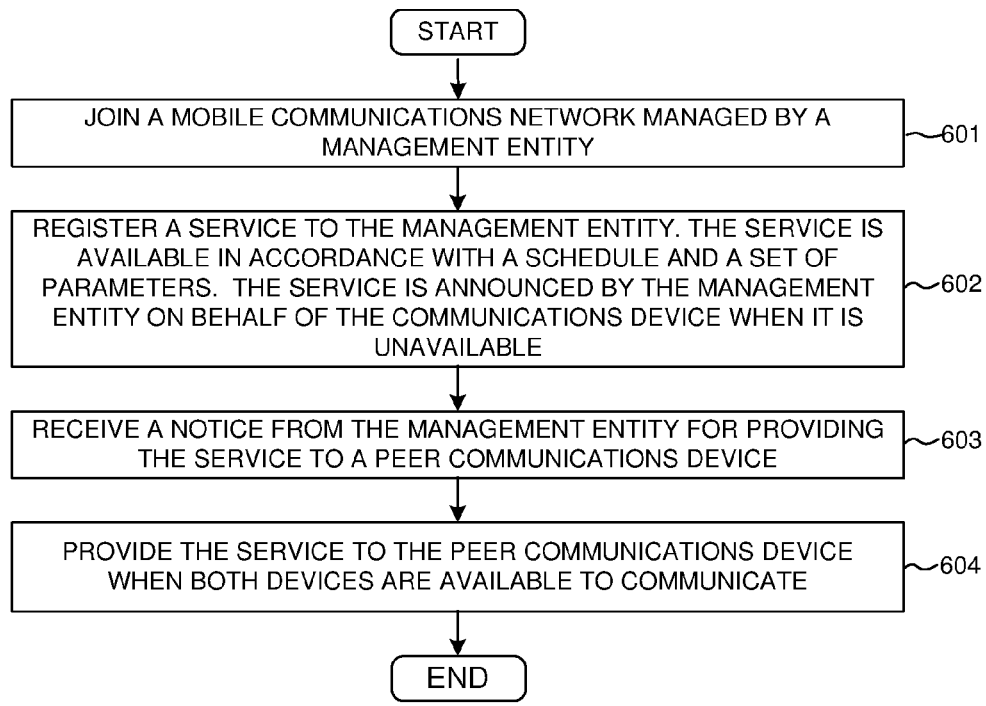
FIG. 6 is flow chart of a method of enhanced service discovery from service advertiser perspective in accordance with a novel aspect.

FIG. 6 is flow chart of a method of enhanced service discovery from service advertiser perspective in accordance with a novel aspect. In step 601, a communications device joins a mobile communications network managed by a management entity. In step 602, the communications device registers a service to the management entity. The service is available in accordance with a schedule and a set of service parameters. The service is announced by the management entity on behalf of the communications device when the communications device is unavailable. In step 603, the communications device receives a notice from the management entity for providing the service to a peer communications device. In step 604, the communications device provides service to the peer communications device when both devices are available to communicate.

Figure 7:
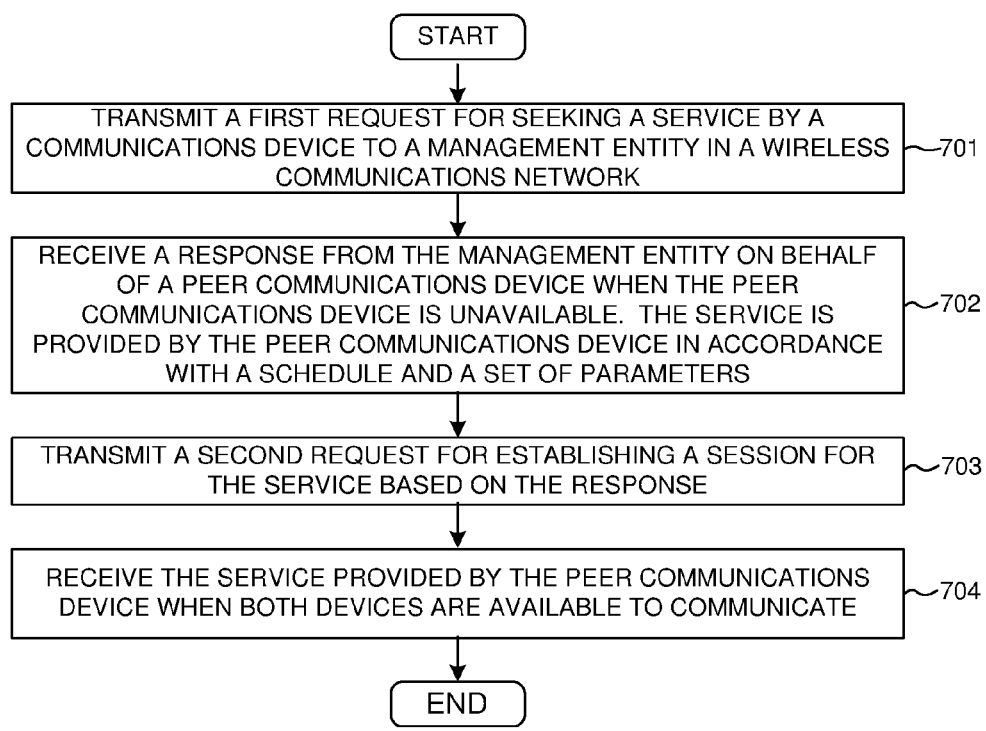
FIG. 7 is flow chart of a method of enhanced service discovery from service seeker perspective in accordance with a novel aspect.

FIG. 7 is flow chart of a method of enhanced service discovery from service seeker perspective in accordance with a novel aspect. In step 701, a communications device transmits a first request for seeking a service to a management entity in a wireless communications network. In step 702, the communications device receives a response from the management entity on behalf of a peer communications device when the peer communications device is unavailable. The service is provided by the peer communications in accordance with a schedule and a set of parameters. In step 703, the communications device transmits a second request for establishing a session for the service based on the response. In step 704, the communications device receives the service provided by the peer communications device when both devices are available to communicate.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. A method, comprising:
by a management device, accepting a first communications device to join a wireless communications network managed by the management device;
registering, by the management device, a service provided by the first communications device;
receiving, by the management device, a request from a second communications device seeking the service;
transmitting, to the second communication device, by the management device, a schedule of availability of the service provided by the first communications device; and
the management device announcing availability of the service on behalf of the first communications device while the first communications device is unavailable,
wherein the service is provided wirelessly by the first communications device to the second communications device when the first communications device and the second communications device are available to communicate with one another.

2. The method of claim 1, wherein the management device is an access point (AP).

3. The method of claim 1, wherein the first communications device is unavailable when entering a power saving mode in accordance with the schedule.

4. The method of claim 1, wherein the first communications device is unavailable when a distance from the second communications device is over a pre-defined range.

5. The method of claim 4, wherein the management device also transmits location information and ranging information of the first communications device.

6. The method of claim 1, wherein the management device exchanges information of service parameters with the second communications device on behalf of the first communications device.

7. The method of claim 1, wherein the management device forwards a session request from the second communications device to the first communications device.

8. A method, comprising:
joining a wireless communications network by a first communications device, wherein the communications network is managed by a management device;
the first communications device registering a service to the management device, wherein registering the service includes sending a schedule of availability of the service to the management device, wherein the service is available in accordance with a set of service parameters, and wherein the service is announced by the management device on behalf of the first communications device when the first communications device is unavailable;
the first communications device receiving a notice from the management device for providing the service to a second communications device; and
the first communications device wirelessly providing the service to the second communications device when the first communications device and the second communications device are available to communicate with one another.

9. The method of claim 8, wherein the service is unavailable when the first communications device enters a power saving mode in accordance with the schedule.

10. The method of claim 9, wherein the schedule is transmitted to the second communications device.

11. The method of claim 8, wherein the service is unavailable when a distance between the first communications device and the second communications device is over a pre-defined range.

12. The method of claim 11, wherein location information and ranging information of the first communications device is transmitted to the second communications device.

13. The method of claim 8, wherein the notice comprises desired service parameters from the second communications device.

14. A method, comprising:
transmitting a first request for a seeking a service by a first communications device to a management device in a wireless communications network;
the first communications device receiving a response from the management device on behalf of a second communications device when the second communications device is unavailable, the response including ranging information of the second communications device, wherein the service is provided by the second communications device in accordance with the ranging information, a schedule and a set of service parameters;
the first communications device transmitting a second request for establishing a session for the service based on the response; and
wirelessly receiving the service provided by the second communications device when the first communications device and the second communications device are available to communicate with one another.

15. The method of claim 14, wherein the service is unavailable when the second communications device enters a power saving mode in accordance with the schedule.

16. The method of claim 15, wherein the first communications device receives the schedule from the management device.

17. The method of claim 15, wherein the service is unavailable when a distance between the first communications device and the second communications device is over a pre-defined range.

18. The method of claim 17, wherein first communications device receives location information of the second communications device.

19. The method of claim 14, wherein the first communications device exchanges desired service parameters with the management device based on the schedule and the set of service parameters.

20. The method of claim 1, wherein the service comprises a Wi-Fi access service.

21. The method of claim 1, wherein the service comprises a print service.

\* \* \* \* \*